(12) United States Patent
Ren et al.

(10) Patent No.: US 12,399,311 B2
(45) Date of Patent: Aug. 26, 2025

(54) DISPLAY DEVICE

(71) Applicant: Wuhan China Star Optoelectronics Technology Co., Ltd., Hubei (CN)

(72) Inventors: Yuanyuan Ren, Hubei (CN); Zhuo Zhang, Hubei (CN); Chengxu Ma, Hubei (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 14 days.

(21) Appl. No.: 17/297,472

(22) PCT Filed: May 19, 2021

(86) PCT No.: PCT/CN2021/094558
§ 371 (c)(1),
(2) Date: May 27, 2021

(87) PCT Pub. No.: WO2022/227139
PCT Pub. Date: Nov. 3, 2022

(65) Prior Publication Data
US 2024/0019624 A1    Jan. 18, 2024

(30) Foreign Application Priority Data

Apr. 28, 2021   (CN) .......................... 202110470869.2

(51) Int. Cl.
*F21V 8/00* (2006.01)
*G02F 1/1333* (2006.01)

(52) U.S. Cl.
CPC ......... *G02B 6/0063* (2013.01); *G02B 6/0088* (2013.01); *G02F 1/133308* (2013.01); *G02F 1/133342* (2021.01)

(58) Field of Classification Search
CPC ......... G02F 1/133608; G02F 1/133342; G02B 6/0086–0091; G02B 6/0043; G02B 6/0076
See application file for complete search history.

(56) References Cited

U.S. PATENT DOCUMENTS

2003/0128316 A1   7/2003  Tsuji
2007/0229724 A1*  10/2007 Sakemoto ......... G02F 1/133308
                                                        349/58
(Continued)

FOREIGN PATENT DOCUMENTS

CN    1461966    12/2003
CN    1580906     2/2005
CN  102588846     7/2012
(Continued)

*Primary Examiner* — Mariceli Santiago

(57) ABSTRACT

A display device including a display module and a support structure is provided. The support structure is connected to the display module and supports the display module. The support structure includes a support plate and a plastic frame. The support plate includes a first lateral surface and a second lateral surface. The plastic frame is protrusively disposed on the first lateral surface. The plastic frame is distributed at a periphery of the light transmissive region. By disposing the support structure and connecting the support structure to the display module, a structural strength of an entire display device is improved, which is a simple structure and is convenient for assembling.

12 Claims, 5 Drawing Sheets

(56) References Cited

U.S. PATENT DOCUMENTS

2008/0191982 A1* 8/2008 Lee .................. G02F 1/133512
                                                            345/87
2015/0268412 A1    9/2015 Lee et al.

FOREIGN PATENT DOCUMENTS

| | | |
|---|---|---|
| CN | 104914619 | 9/2015 |
| CN | 105589239 | 5/2016 |
| CN | 105652519 | 6/2016 |
| CN | 208141091 | 11/2018 |
| CN | 209912424 | 1/2020 |
| CN | 211019791 | 7/2020 |
| DE | 102004038344 | 2/2005 |
| JP | 2002-244133 | 8/2002 |
| JP | 2006-276585 | 10/2006 |
| JP | 2008-242217 | 10/2008 |
| JP | 2009-080945 | 4/2009 |
| KR | 20100011817 A * | 2/2010 |
| KR | 20100025174 A * | 3/2010 |
| KR | 10-1218277 | 1/2013 |
| KR | 10-2013-0067986 | 6/2013 |
| TW | 201435449 | 9/2014 |
| TW | I522698 | 2/2016 |

\* cited by examiner

DISPLAY DEVICE

RELATED APPLICATIONS

This application is a National Phase of PCT Patent Application No. PCT/CN2021/094558 having International filing date of May 19, 2021, which claims the benefit of priority of Chinese Patent Application No. 202110470869.2 filed on Apr. 28, 2021. The contents of the above applications are all incorporated by reference as if fully set forth herein in their entirety.

FIELD AND BACKGROUND OF THE INVENTION

The present application relates to the field of display technology and specifically relates to a display device.

With development of liquid crystal display technology, applications of double-sided display devices have become more and more widespread. In double-sided display devices, two display panels are stacked and assembled and have advantages of ability to display images on two sides, which can be used in offices of communication industry, government services, financial industry, transportation industry, and other industries. When the double-sided display devices are used as televisions in daily life, they can be embedded in door frames or partition walls of adjacent rooms, so that people in different rooms can obtain information at a same time.

In order to reduce a thickness of the double-sided display devices, one light guide plate with a light source and a transflective film acting as a backlight assembly is adopted in current double-sided display devices to provide backlight for two display panels. Each film layer in the display panel is usually selected as a relatively thin type, resulting in poor rigidity of the double-sided display devices and easy deformation, thereby causing damage to the double-sided display devices.

SUMMARY OF THE INVENTION

The present application provided a display device, which aims to solve the problem of poor rigidity and easy deformation of the current double-sided display devices.

On a first aspect, the present application provides a display device, the display device includes:
a display module including a first display panel and a second display panel disposed oppositely and a backlight component disposed between the first display panel and the second display panel, wherein, the backlight component includes a light guide plate and a light source disposed on a lateral side of the light guide plate, the first display panel and the second display panel have light incident surfaces, and the light incident surfaces of the first display panel and the second display panel are respectively opposite to the backlight component;
a support structure, wherein the support structure is connected to the display module and supports the display module, the support structure includes a support plate and a plastic frame, the support plate includes a first lateral surface and a second lateral surface which are opposite to each other, the support plate has a light transmissive region, the plastic frame is protrusively disposed on the first lateral surface, the plastic frame is distributed at a periphery of the light transmissive region, and a surface of the plastic frame away from the support plate is connected to the first display panel.

Optionally, the support structure further includes a lateral wall protrusively disposed on a lateral edge of the support plate, the support plate and the lateral wall enclose an accommodating space, the backlight component is disposed in the accommodating space; a support part extends from a side of the lateral wall away from the support plate toward the accommodating space, and a surface of the support part away from the support plate is connected to the second display panel.

Optionally, a via hole is defined on the support plate to form the light transmissive region, and the plastic frame is disposed on a lateral edge of the via hole.

Optionally, a boss is disposed on the first lateral surface close to the lateral edge of the via hole, a groove corresponding to the boss is defined on the plastic frame, and the boss is inserted in the groove.

Optionally, the backlight component includes a light guide plate and a light source disposed on a side of the light guide plate, the lateral wall comprises a first lateral wall and a second lateral wall sequentially distributed from the light source to the light guide plate, the support part extends from a side of the first lateral wall away from the support plate toward the accommodating space, and the surface of the support part away from the support plate is connected to the second display panel.

Optionally, a surface of the support part close to the support plate is connected to the light guide plate.

On a second aspect, the present application provides a display device, the display device includes:
a display module including a first display panel and a second display panel disposed oppositely and a backlight component disposed between the first display panel and the second display panel, wherein the first display panel and the second display panel have light incident surfaces, and the light incident surfaces of the first display panel and the second display panel are respectively opposite to the backlight component;
a support structure, wherein the support structure is connected to the display module and supports the display module, the support structure includes a support plate and a plastic frame, the support plate includes a first lateral surface and a second lateral surface which are opposite to each other, the support plate has a light transmissive region, the plastic frame is protrusively disposed on the first lateral surface, the plastic frame is distributed on a periphery of the light transmissive region, and a surface of the plastic frame away from the support plate is connected to the first display panel.

Optionally, the support structure further includes a lateral wall protrusively disposed on a lateral edge of the support plate, the support plate and the lateral wall enclose an accommodating space, the backlight component is disposed in the accommodating space; a support part extends from a side of the lateral wall away from the support plate toward the accommodating space, and a surface of the support part away from the support plate is connected to the second display panel.

Optionally, a via hole is defined on the support plate to form the light transmissive region, and the plastic frame is disposed on a lateral edge of the via hole.

Optionally, a boss is disposed on the first lateral surface close to the lateral edge of the via hole, a groove corresponding to the boss is defined on the plastic frame, and the boss is inserted in the groove.

Optionally, the backlight component includes a light guide plate and a light source disposed on a side of the light guide plate, the lateral wall includes a first lateral wall and a second lateral wall sequentially distributed from the light source to the light guide plate, the support part extends from a side of the first lateral away from the support plate toward the accommodating space, and the surface of the support part away from the support plate is connected to the second display panel.

Optionally, a surface of the support part close to the support plate is connected to the light guide plate.

Optionally, a connection element is disposed on the support plate close to the second lateral wall, and an end of the connection element is connected to the second display panel, and another end of the connection element is connected to the support plate.

Optionally, an area of the first display panel is smaller than an area of the second display panel.

Optionally, a material of the support plate is stainless steel or aluminum.

Optionally, the support plate and the plastic frame are integrally formed.

Optionally, the plastic frame and the support plate enclose to form a mounting cavity, the second display panel is disposed in the mounting cavity, and the second display panel is located between the first display panel and the first lateral surface and is connected to the first lateral surface.

Optionally, a material of the support plate is resin or glass.

Optionally, a lateral side of the plastic frame is connected to a lateral side of the backlight component.

Optionally, an area of the second display panel is less than or equal to an area of the first display panel.

The present application provides a display device, including a display component and a support structure. The display module includes the first display panel and the second display panel disposed oppositely and the backlight component disposed between the first display panel and the second display panel. The first display panel and the second display panel have light incident surfaces. The light incident surfaces of the first display panel and the second display panel are respectively opposite to the backlight component. The support structure is connected to the display module and supports the display module. The support structure includes the support plate and the plastic frame. The support plate includes the first lateral surface and a second lateral surface which are opposite to each other. The support plate has a light transmissive region. The plastic frame is protrusively disposed on the first lateral surface. The plastic frame is distributed on a periphery of the light transmissive region. The surface of the plastic frame away from the support plate is connected to the first display panel. By disposing the support structure and connecting the support structure to the first display panel and the second display panel, the structural strength of the entire display device is improved, preventing deformation from occurring. Furthermore, the structure is relatively simple and is conducive to being assembled.

BRIEF DESCRIPTION OF THE SEVERAL VIEWS OF THE DRAWINGS

The technical solutions and other advantageous effects of the present invention will be apparent with reference to the following accompanying drawings and detailed description of embodiments of the present disclosure.

Figure 1:
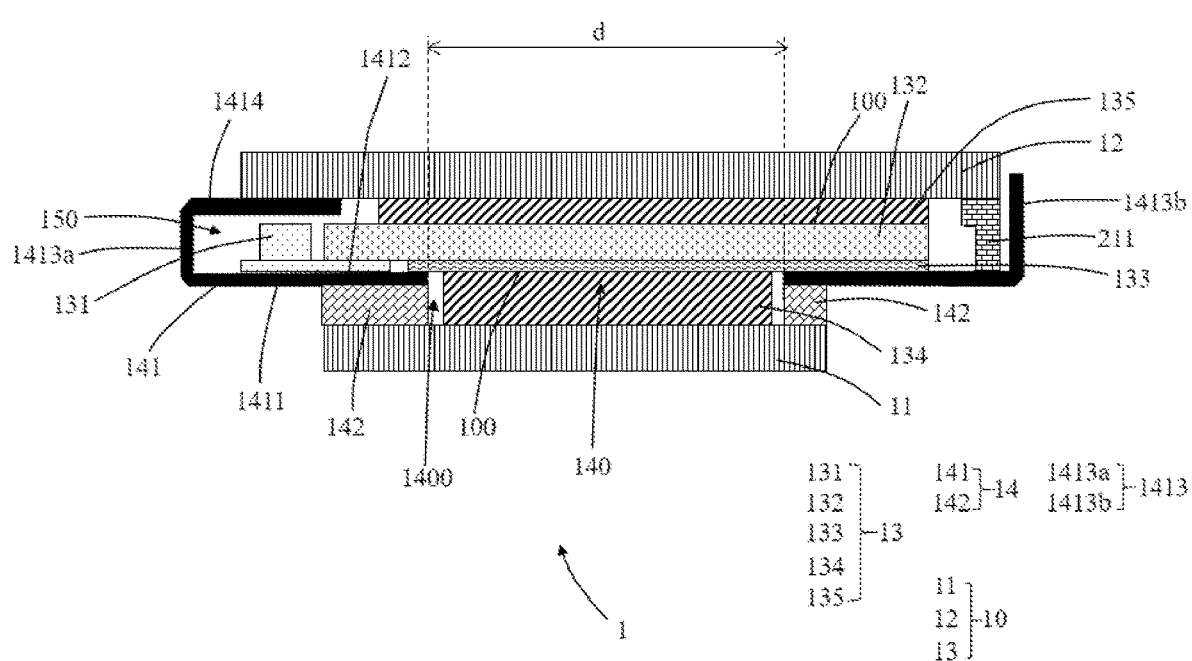
FIG. 1 is structural schematic diagram of a display device of a first embodiment of the present application.

| reference numbers in accompanying figures | name of element | reference numbers in accompanying figures | name of element |
|---|---|---|---|
| 1 | display device | 10 | display module |
| 11 | first display panel | 211 | connection element |
| 12 | second display panel | 13 | backlight component |
| 134 | first optical film layer | 135 | second optical film layer |
| 100 | light incident surface | 131 | light source |
| 132 | light guide plate | 14 | support structure |
| 133 | transflective film | d | distance |
| 141 | support plate | 142 | plastic frame |
| 1411 | first lateral surface | 1412 | second lateral surface |
| 140 | transmissive region | 1413 | lateral wall |
| 1413a | first lateral wall | 1413b | second lateral wall |
| 150 | accommodating space | 1414 | support part |
| 1400 | via hole | 1410 | boss |
| 1420 | groove | 200 | mounting cavity |

DESCRIPTION OF SPECIFIC EMBODIMENTS OF THE INVENTION

The technical solutions in the embodiments of the present disclosure are clearly and completely described in the following with reference to the accompanying drawings in the embodiments of the present disclosure. Obviously, the described embodiments are only part of the embodiments of the present disclosure, and are not all embodiments of the present disclosure. All other embodiments obtained by those skilled in the art based on the embodiments of the present disclosure without creative efforts are within the scope of the present disclosure. Besides, it should be understood that the specific embodiments described herein are merely for describing and explaining the present disclosure and are not intended to limit the present disclosure. In the present disclosure, unless opposite stated, the orientation words used such as "upper" and "lower" generally refer to the upper and lower directions of the device in actual using or working state, and specifically refer to the drawing directions in the drawings, and "inner" and "outer" refer to the outline of the device.

One embodiment of the present application provides a display device. The details are described below respectively. It should be noted that a description order of the following embodiments is not intended to limit a preferred order of the embodiments.

FIG. 1 is structural schematic diagram of a display device 1 of a first embodiment of the present application. As illustrated in the figure, the display device 1 includes a display module 10 and a support structure 14. The display module 10 includes a first display panel 11 and a second display panel 12 disposed oppositely and a backlight component 13 disposed between the first display panel 11 and the second display panel 12. The first display panel 11 and the second display panel 12 have light incident surfaces 100. The light incident surfaces 100 of the first display panel 11 and the second display panel 12 are respectively opposite to the backlight component 13. As such, the backlight component 13 provides a light source 131 to the first display panel 11 and the second display panel 12.

The support structure 14 includes a support plate 141 and a plastic frame 142. The support plate 141 includes a first lateral surface 1411 and a second lateral surface 1412 which are opposite to each other. The support plate 141 has a light transmissive region 140. The light transmissive region 140 corresponding to a first optical film layer 134 of the backlight component 13 allows light emitted from the backlight component 13 to pass through the support plate 141 and to irradiate on the first display panel 11. The plastic frame 142 is protrusively disposed on the first lateral surface 1411 and is distributed on a periphery of the light transmissive region 140. The surface of the plastic frame 142 away from the support plate 141 is connected to the first display panel 11 to support the first display panel 11.

In the first embodiment of the present application, the second display panel 12 is opposite to the second lateral surface 1412 and is connected to the support plate 141.

As illustrated in FIG. 1, the support structure 14 further includes a lateral wall 1413 protrusively disposed on a lateral edge of the support plate 141; the support plate 141 and the lateral wall 1413 enclose an accommodating space 150; the backlight component 13 is disposed in the accommodating space 150; a support part 1414 extends from a side of the lateral wall 1413 away from the support plate 141 toward the accommodating space 150, i.e., the support part 141 is formed from extension of the lateral wall 1413; and a surface of the support part 1414 away from the support plate 141 is connected to the second display panel 12 to support the second display panel 12.

In order to reduce a thickness and a weight of the display module 10 to realize thinness, the first display panel 11 and the second display panel 12 are provided with the light source 131 by a layer of the backlight component, and a relatively thin film material is also used on the first display panel 11 and the second display panel 12. As a result, the display module 10 composed of the first display panel 11, the second display panel 12, and the backlight component 13 has poor rigidity and is prone to be deformed, causing damage to the display module 10.

By disposing the support structure 14 including the support plate 141 and the plastic frame 142, by supporting the first display panel 11 through the plastic frame 142, and by supporting the second display panel 12 through the support plate 141, connection between the support structure 14 and the display module 10 and support for the display module 10 from the support structure 14 are realized, which improves rigidity of the display module 10 and prevents the display module 10 from being deformed. In addition, the support structure 14 is composed of the support plate 141 and the plastic frame 142 protrusively disposed on the support plate 141, which is a simple structure convenient to fabricate, and is also conducive to assembling the display device 1.

In the present application, the backlight component 13 includes a light guide plate 132, the light source 131 disposed on a side of the light guide plate 132, a transflective film 133 disposed between the light guide plate 132 and the support plate 141, and a first optical film layer 134 and a second optical film layer 135 respectively disposed on two sides of the light guide plate 132.

The lateral wall 1413 includes a first lateral wall 1413a and a second lateral wall 1413b sequentially distributed from the light source 131 to the light guide plate 132. The support part 1414 extends from a side of the lateral wall 1413a away from the support plate 141 toward the accommodating space 150.

A surface of the support part 1414 away from the support plate 141 is connected to the second display panel 12.

As illustrated in FIG. 1, by disposing the support part 1414 extending from the side of the lateral wall 1413a away from the support plate 141 toward the accommodating space 150, a U-shaped structure is formed between the support part 1414, the first lateral wall 1413a, and the support plate 141, which allows the light source 131 and the light guide plate 132 can be disposed in the U-shaped structure.

Figure 3:
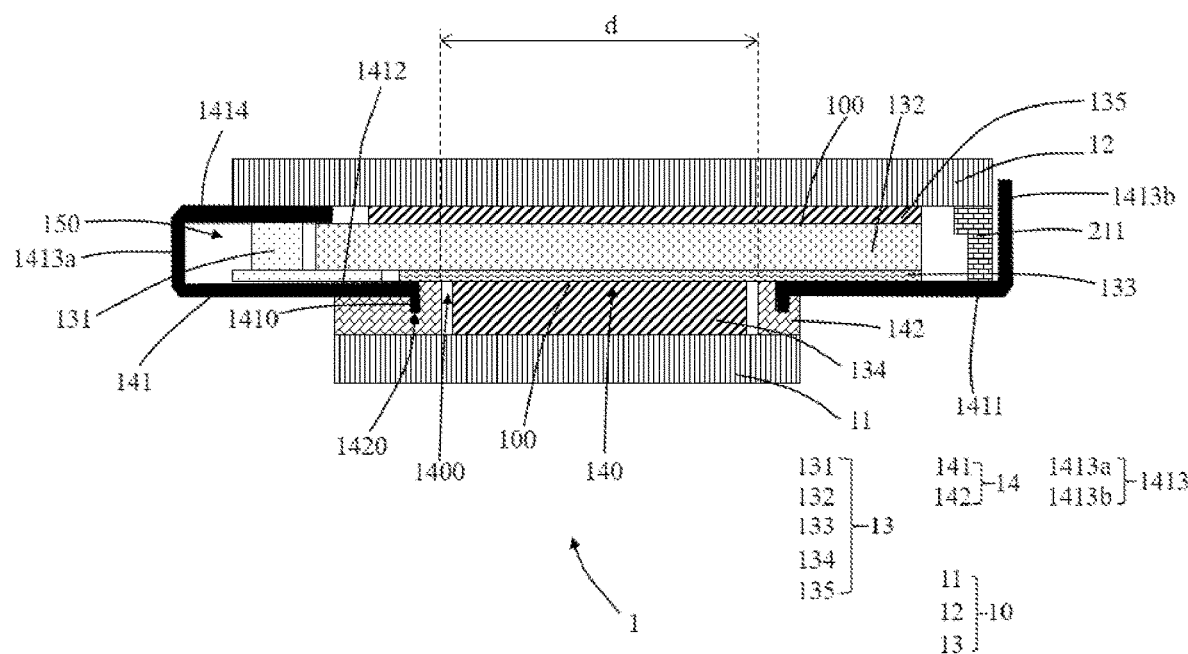
FIG. 3 is a structural schematic diagram of the display device of a third embodiment of the present application.

It should be noted that, a gap can be left between a surface of the support part 1414 close to the support plate 141 and the light guide plate 132, or the surface of the support part 1414 close to the support plate 141 is connected to the light guide plate 132. Preferably, as illustrated in FIG. 3, the surface of the support part 1414 close to the support plate 141 is connected to the light guide plate 13 to realize engagement on the light guide plate 132, which improves stability of the structure.

In one embodiment provided by the present application, as illustrated in FIG. 1, a connection element 211 is disposed on the support plate 141 close to the second lateral wall 1413b. An end of the connection element 211 is connected to the second display panel 12, and another end of the connection element 211 is connected to the support plate 141 to realize support for the second display panel 12. A plastic material is generally used for the connection element 211.

It should be noted that at a location of the support plate 141 close to the first lateral wall 1413a and the second lateral wall 1413b, a manner of disposing the connection element 211 can be simultaneously adopted to realize support for the second display panel 12; a manner of bending and extending the lateral wall 1413 to form the support part 1414 is also allowed to be adopted to realize support for the second display panel 12 at the same time; in addition, a manner of disposing the connection element 211 on one side and disposing the support part 1414 on the other side is also allowed to be adopted. When the connection element 211 is adopted, a weight of the entire structure can be reduced. When the support part 1414 is adopted, the rigidity of the structure is relatively great, which has a better support ability for the display panel. Specific embodiments can be determined according to practical situations, which are not limited herein.

As illustrated in FIG. 1, the first optical film layer 134 of the backlight component 13 is disposed in a box body encircled by the plastic frame 142, and a gap is left between the edge of the plastic frame 142 and the first optical film layer 134 to leave a space for expansion of the first optical film layer 134.

In the first embodiment of the present application, as illustrated in FIG. 1, a via hole 1400 is defined on the support plate 141 to form the light transmissive region 140. In addition, defining the via hole 1400 can also reduce the weight of the support structure, which is conducive to thinness of the display device 1. The plastic frame 142 is disposed on a lateral edge of the via hole 1400. Therefore, after the first optical film layer 134 expands, the lateral edges of the plastic frame 142 can penetrate the via hole 1400 to connect to the lateral edge of the first optical film layer 134, which improves stability of the structure.

Figure 2:
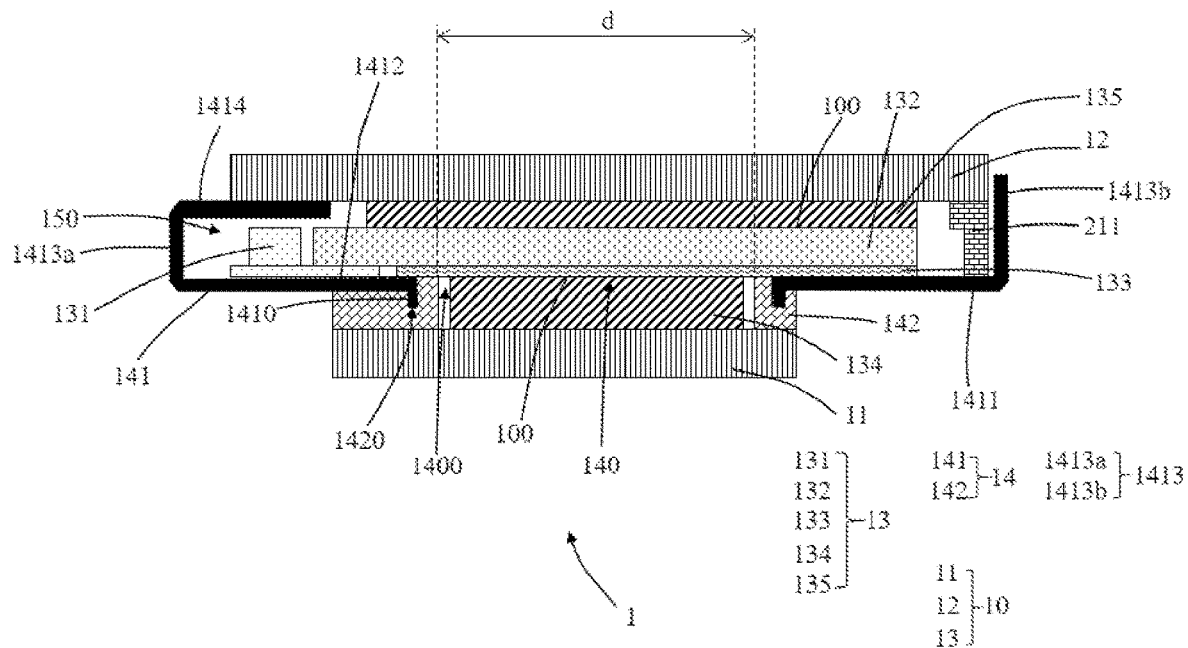
FIG. 2 is a structural schematic diagram of the display device of a second embodiment of the present application.

FIG. 2 is a structural schematic diagram of the display device of a second embodiment of the present application. As illustrated in FIG. 2, a boss 1410 is disposed on the first lateral surface 1411 of the support plate 141 close to the lateral edge of the via hole 1400, a groove 1420 corresponding to the boss 1410 is defined on the plastic frame 142, and the boss 1410 is inserted in the groove 1420.

The boss 1410 disposed on the lateral edge of the via hole 1400 can serve an effect of enhancing ribs, which improves rigidity and strength of the support plate 141 at the via hole 1400. By disposing the groove corresponding to the boss 1410 on the plastic frame 142 and by inserting the boss 1410 into the groove, connection between the plastic frame 142 and the support plate 141 is firmer.

It should be noted that, the larger an area of the first display panel 11 is, the larger a required light transmissive region 140 is, and correspondingly, the larger the via hole 1400 that needs to be defined on the support plate 141 is. Preferably, in one embodiment of the present application, the area of the first display panel 11 is less than or equal to an area of the second display panel 12. Therefore, low strength of the entire structure caused by a large-area via hole 1400 being defined on the support plate 141 is prevented.

It should be noted that, in the first embodiment and the second embodiment of the present application, a plate of stainless steel or a metal material of relative high rigidity such as aluminum of high rigidity can be adopted on the support plate 141, and the support plate 141 can be formed by a stamping method. The plastic frame 142 and the support plate 141 can be integrally formed. After the support plate 141 is stamped, the plastic frame 142 can be formed on the support plate 141 by a pouring method, thereby simplifying fabrication processes of the support structure 14.

Regarding the display device 1 in the first embodiment and the second embodiment, when the display device 1 is assembled, the backlight component 13 and the second display panel 12 can be mounted on the support structure 14 in advance, then the support structure 14 is flipped, and then the first display panel 11 is mounted on the support structure 14. When the backlight component 13 and the second display panel 12 are mounted in advance, the backlight component 13 can provide support for subsequent installation of the first display panel 11 to allow assembling of the display device 1 to be easier.

Figure 4:
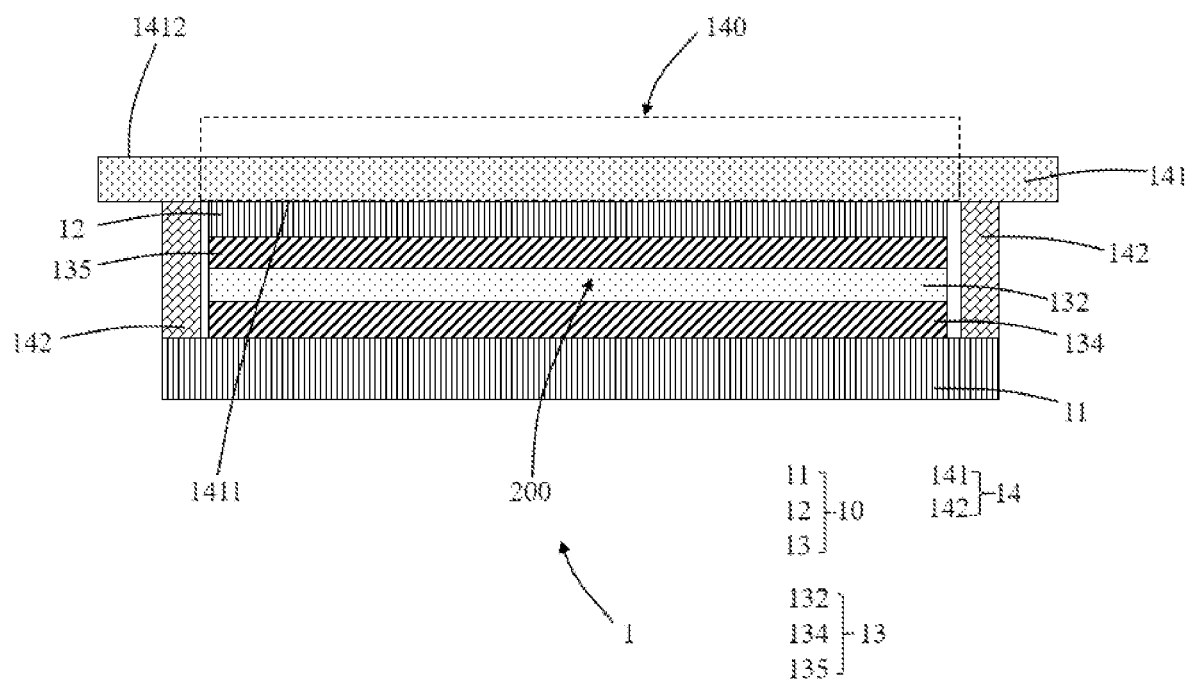
FIG. 4 is a structural schematic diagram of the display device of a fourth embodiment of the present application
Figure 5:
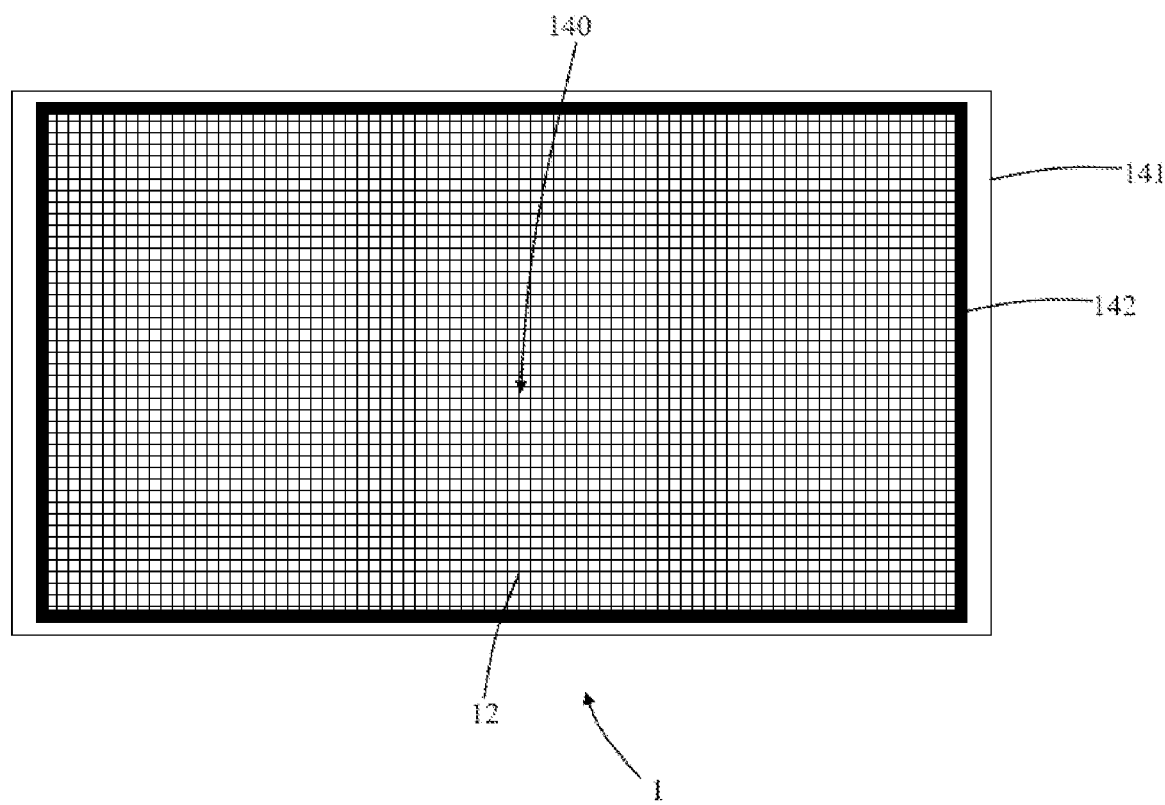
FIG. 5 is a top view of the display device in FIG. 4.

With reference to FIG. 4 and FIG. 5, the support plate 141 includes the first lateral surface 1411 and the second lateral surface 1412 which are opposite to each other. The support plate 141 has a light transmissive region 140. The plastic frame 142 and the support plate 141 enclose to form a mounting cavity 200. The second display panel 12 is disposed in the mounting cavity 200. The second display panel 12 is located between the first display panel 11 and the first lateral surface 1411 and is attached and connected to the first lateral surface 1411. A surface of the plastic frame 142 away from the support plate 141 is connected to the first display panel 11. The plastic frame 142 and the first display panel 11 can be bonded by adhesive tapes to realize fixation of the two.

In a fourth embodiment of the present application, a transparent material such as glass or resin can be adopted on the support plate 141. The plastic frame 142 can be fixed with the support plate 141 by bonding. The second display panel 12 is located between the first display panel 11 and the first lateral surface 1411 and is connected to the first lateral surface 1411.

By connecting the second display panel 12 to the support plate 141 and by connecting the surface of the plastic frame 142 away from the support plate 141 to the first display panel 11, connection between support structure 14 and the display module 10 is realized. Furthermore, support of the support structure 14 for the display module 10 improves the rigidity of the display device 1 and reduces the risk of deformation occurring on the display module 10.

Because the second display panel 12 is disposed in the mounting cavity 200 enclosed by the plastic frame 12 and the support plate 141, the larger the size of the second display panel 12 is, the larger the space of the required mounting cavity 200 is, and the longer a distance d between lateral edges of the plastic frame 142 is. Preferably, the area of the second display panel 12 being less than or equal to the area of the first display panel 11 prevents poor support ability caused by a contacting area between the plastic frame 142 and the first display panel 11 being too small when the distance d between the lateral edges of the plastic frame 142 is too long.

Regarding the display device 1 in the fourth embodiment, when the display device 1 is assembled, the second display panel 12 can be bonded to the support plate 141 first, then the plastic frame 142 is disposed on the support plate 141 to allow the plastic frame 142 and the support plate 141 to encircle to form the mounting cavity 200, and then the second optical film layer 135 is put into the mounting cavity 200. In this way, a film structure can be prevented from scattering when the second optical film layer 135 is assembled first.

After the second display panel 12 is assembled, the backlight component 13 and the first display panel 11 is mounted on the support structure 14. Finally, an encapsulation adhesive is attached (not shown in the figure).

Figure 6:
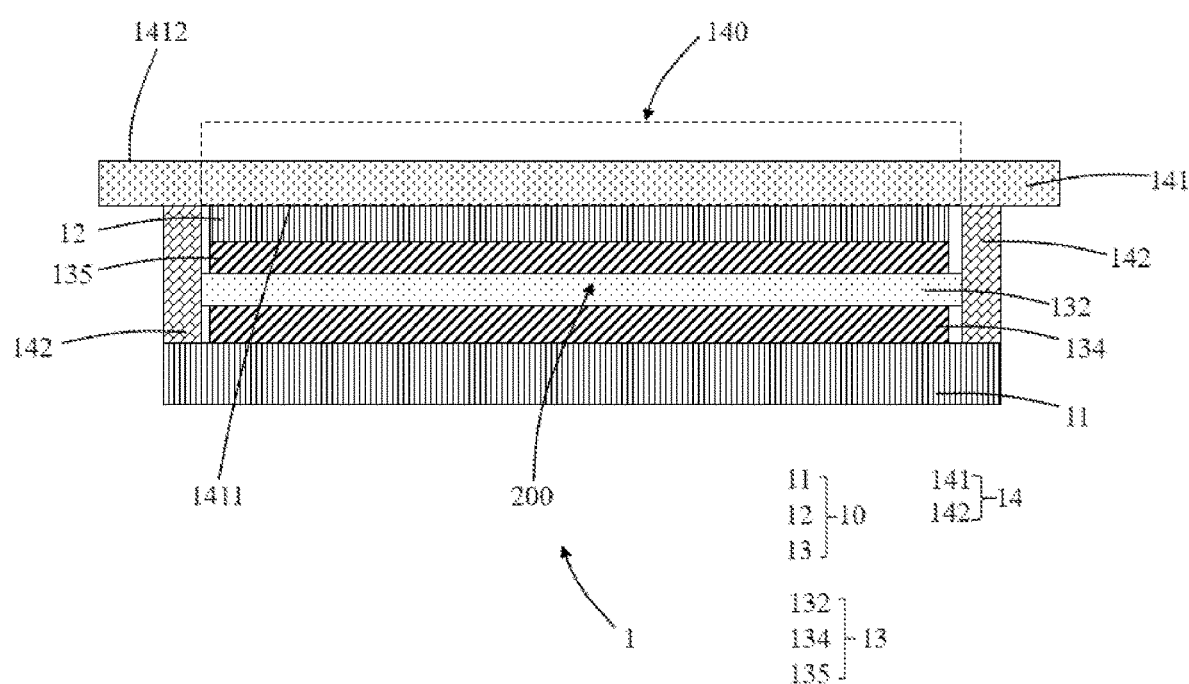
FIG. 6 is a structural schematic diagram of the display device of a fifth embodiment of the present application.

It should be noted that, a gap can be left between a lateral edge of the backlight component 13 and a lateral edge of the plastic frame 142, or the backlight component 13 and the plastic frame 142 can be connected to each other. Preferably, in the fifth embodiment of the present application, as illustrated in FIG. 6, the lateral edge of the plastic frame 142 is connected to a lateral edge of the light guide plate 132 in the backlight component 13 to realize engagement for the backlight component 13 to improve stability of the structure (the light source in the backlight component 13 and the transflective film are not shown in FIG. 4 and FIG. 6).

The display device provided by embodiments of present disclosure are described in detail above. This article uses specific cases for describing the principles and the embodiments of the present disclosure, and the description of the embodiments mentioned above is only for helping to understand the method and the core idea of the present disclosure. It should be understood by those skilled in the art, that it can perform changes in the technical solution of the embodiments mentioned above, or can perform equivalent replacements in part of technical characteristics, and the changes or replacements do not make the essence of the corresponding technical solution depart from the scope of the technical solution of each embodiment of the present disclosure.

What is claimed is:
1. A display device, comprising:
a display module comprising a first display panel and a second display panel disposed oppositely and a backlight component disposed between the first display panel and the second display panel, wherein the back- light component comprises a light guide plate and a light source disposed on a lateral side of the light guide plate, the first display panel and the second display panel have light incident surfaces, and the light incident surfaces of the first display panel and the second display panel are respectively opposite to the backlight component; and a support structure, wherein the support structure is connected to the display module and supports the display module, the support structure comprises a support plate and a plastic frame, the support plate comprises a first lateral surface and a second lateral surface which are opposite to each other, the support plate has a light transmissive region, the plastic frame is protrusively disposed on the first lateral surface, the plastic frame is distributed at a periphery of the light transmissive region, and a surface of the plastic frame away from the support plate is connected to the first display panel, wherein a via hole is defined on the support plate to form the light transmissive region, and the plastic frame is disposed on a lateral edge of the via hole, and a boss is disposed on the first lateral surface close to the lateral edge of the via hole, a groove corresponding to the boss is defined on the plastic frame, and the boss is inserted in the groove.

2. The display device as claimed in claim 1, wherein the support structure further comprises a lateral wall protrusively disposed on a lateral edge of the support plate, the support plate and the lateral wall enclose an accommodating space, the backlight component is disposed in the accommodating space; a support part extends from a side of the lateral wall away from the support plate toward the accommodating space, and a surface of the support part away from the support plate is connected to the second display panel.

3. The display device as claimed in claim 2, wherein the lateral wall comprises a first lateral wall and a second lateral wall sequentially distributed from the light source to the light guide plate, the support part extends from a side of the first lateral wall away from the support plate toward the accommodating space.

4. The display device as claimed in claim 3, wherein a surface of the support part close to the support plate is connected to the light guide plate.

5. The display device as claimed in claim 1, wherein a material of the support plate is stainless steel or aluminum.

6. The display device as claimed in claim 5, wherein the support plate and the plastic frame are integrally formed.

7. A display device, comprising:

a display module comprising a first display panel and a second display panel disposed oppositely and a backlight component disposed between the first display panel and the second display panel, the first display panel and the second display panel have light incident surfaces, and the light incident surfaces of the first display panel and the second display panel are respectively opposite to the backlight component; and a support structure, wherein the support structure is connected to the display module and supports the display module, the support structure comprises a support plate and a plastic frame, the support plate comprises a first lateral surface and a second lateral surface which are opposite to each other, the support plate has a light transmissive region, the plastic frame is protrusively disposed on the first lateral surface, the plastic frame is distributed at a periphery of the light transmissive region, and a surface of the plastic frame away from the support plate is connected to the first display panel, wherein a via hole is defined on the support plate to form the light transmissive region, and the plastic frame is disposed on a lateral edge of the via hole, and a boss is disposed on the first lateral surface close to the lateral edge of the via hole, a groove corresponding to the boss is defined on the plastic frame, and the boss is inserted in the groove.

8. The display device as claimed in claim 7, wherein the support structure further comprises a lateral wall protrusively disposed on a lateral edge of the support plate, the support plate and the lateral wall enclose an accommodating space, the backlight component is disposed in the accommodating space; a support part extends from a side of the lateral wall away from the support plate toward the accommodating space, and a surface of the support part away from the support plate is connected to the second display panel.

9. The display device as claimed in claim 8, wherein the backlight component comprises a light guide plate and a light source disposed on a side of the light guide plate, the lateral wall comprises a first lateral wall and a second lateral wall sequentially distributed from the light source to the light guide plate, the support part extends from a side of the first lateral wall away from the support plate toward the accommodating space.

10. The display device as claimed in claim 9, wherein a surface of the support part close to the support plate is connected to the light guide plate.

11. The display device as claimed in claim 9, wherein a connection element is disposed on the support plate close to the second lateral wall, and an end of the connection element is connected to the second display panel, and another end of the connection element is connected to the support plate.

12. The display device as claimed in claim 8, wherein an area of the first display panel is less than or equal to an area of the second display panel.

* * * * *